US008876960B2

(12) United States Patent
Kalinowski et al.

(10) Patent No.: US 8,876,960 B2
(45) Date of Patent: Nov. 4, 2014

(54) METHOD AND SYSTEM FOR TRANSPORTING AND PROCESSING SOUR FLUIDS

(75) Inventors: David W. Kalinowski, Sugarland, TX (US); James E. Chitwood, Spring, TX (US); James O. Y. Ong, Houston, TX (US); Rui Song, Pearland, TX (US)

(73) Assignee: Chevron U.S.A Inc., San Ramon, CA (US)

( * ) Notice: Subject to any disclaimer, the term of this patent is extended or adjusted under 35 U.S.C. 154(b) by 0 days.

(21) Appl. No.: 12/561,029

(22) Filed: Sep. 16, 2009

(65) Prior Publication Data

US 2011/0061532 A1  Mar. 17, 2011

(51) Int. Cl.
*B01D 53/14* (2006.01)
*B01D 47/00* (2006.01)
*B01D 59/26* (2006.01)
*B01D 19/00* (2006.01)
*B01D 53/18* (2006.01)

(52) U.S. Cl.
CPC ............ *B01D 53/1462* (2013.01); *B01D 53/18* (2013.01); *B01D 53/1425* (2013.01); *B01D 2252/204* (2013.01); *B01D 2257/80* (2013.01)
USPC .................... 96/234; 95/149; 95/187; 95/235; 95/236; 95/156; 95/223; 96/243; 96/181; 96/155

(58) Field of Classification Search
None
See application file for complete search history.

(56) References Cited

U.S. PATENT DOCUMENTS

| | | | |
|---|---|---|---|
| 4,511,381 A * | 4/1985 | Mehra | 62/625 |
| 4,728,341 A | 3/1988 | Nielsen | |
| 4,978,512 A | 12/1990 | Dillon | |
| 5,094,824 A * | 3/1992 | VanKleeck | 423/224 |
| 5,401,300 A | 3/1995 | Lokhandwala et al. | |
| 5,405,591 A | 4/1995 | Galloway | |
| 5,407,466 A | 4/1995 | Lokhandwala et al. | |
| 5,407,467 A | 4/1995 | Lokhandwala et al. | |
| 5,468,458 A | 11/1995 | Watson | |
| 5,478,536 A | 12/1995 | Galloway | |

(Continued)

FOREIGN PATENT DOCUMENTS

WO WO9850135 11/1998

OTHER PUBLICATIONS

Citing the definition of "remote" as found on Dictionary.com. http://dictionary.reference.com/browse/remote (Jun. 21, 2012).*

(Continued)

*Primary Examiner* — Frank Lawrence, Jr.
*Assistant Examiner* — Pankti Patel
(74) *Attorney, Agent, or Firm* — Karen R. DiDomenicis; Nicholas F. Gallo; Melissa Patangia

(57) ABSTRACT

A method and system for transporting and processing sour gas are provided. The method includes collecting a sour gas at a collection location, which has an associated sweetening device, and delivering a solvent to the sweetening device from a regeneration device remote therefrom. The sour gas is treated at the collection location with the solvent in the associated sweetening device to form a sweetened gas and a sour gas-rich solvent. The sweetened gas is transported from the sweetening device to a gas processing plant remote therefrom, and the sour gas-rich solvent from the sweetening device is delivered to the regeneration device for regeneration therein.

8 Claims, 3 Drawing Sheets

(56) References Cited

U.S. PATENT DOCUMENTS

| | | |
|---|---|---|
| 5,552,060 A | 9/1996 | Roof |
| 5,558,698 A | 9/1996 | Baker et al. |
| 5,648,054 A | 7/1997 | DeBerry |
| 5,705,135 A | 1/1998 | Deberry et al. |
| 5,744,024 A | 4/1998 | Sullivan, III et al. |
| 5,820,837 A | 10/1998 | Marjanovich et al. |
| 5,980,845 A * | 11/1999 | Cherry .......... 423/229 |
| 6,136,282 A | 10/2000 | Fisher |
| 6,183,540 B1 * | 2/2001 | Thonsgaard .......... 95/166 |
| 6,287,535 B1 | 9/2001 | Schendel |
| 6,506,357 B2 | 1/2003 | Watson et al. |
| 6,517,801 B2 | 2/2003 | Watson et al. |
| 6,582,624 B2 | 6/2003 | Titley et al. |
| 6,652,826 B1 | 11/2003 | Chowdhury et al. |
| 6,767,746 B2 | 7/2004 | Swallow et al. |
| 6,881,389 B2 | 4/2005 | Paulsen et al. |
| 6,893,620 B2 | 5/2005 | Watson et al. |
| 6,919,059 B2 | 7/2005 | Watson et al. |
| 7,018,451 B1 | 3/2006 | Torkildsen et al. |
| 7,060,233 B1 | 6/2006 | Srinivas et al. |
| 7,115,215 B2 | 10/2006 | Titley et al. |
| 7,152,431 B2 | 12/2006 | Amin et al. |
| 7,273,513 B2 * | 9/2007 | Linga et al. .......... 95/235 |
| 2002/0012622 A1 * | 1/2002 | Frondorf .......... 423/228 |
| 2003/0103884 A1 | 6/2003 | Lynn |
| 2004/0118745 A1 | 6/2004 | Rettger et al. |
| 2005/0172807 A1 * | 8/2005 | Mak .......... 95/235 |
| 2006/0057056 A1 | 3/2006 | Chretien |
| 2008/0107581 A1 * | 5/2008 | Sparling et al. .......... 423/222 |
| 2012/0240650 A1 * | 9/2012 | Iyer et al. .......... 71/31 |

OTHER PUBLICATIONS

Confuorto and Rameshni, Production of elemental sulfur from boiler flue gas utilizing the Labsorb regenerative SO2 scrubbing system and RSR technology (2006), Digitalrefining.com.*

PCT Notification of Transmittal of International Search Report and the Written Opinion of the International Searching Authority, or the Declaration, dated May 26, 2011 (8 pages).

European Search Report dated Feb. 3, 2014, regarding European Patent Application No. 10817683.5 (13 pages).

* cited by examiner

METHOD AND SYSTEM FOR TRANSPORTING AND PROCESSING SOUR FLUIDS

BACKGROUND OF THE INVENTION

1. Field of the Invention

This invention relates to a method and system for transporting and processing sour fluids, such as sour natural gas, that may be collected in remote locations.

2. Description of Related Art

Acid fluids are fluids that contain significant amounts of acidic gases such as hydrogen sulfide or carbon dioxide. One type of acid fluid that is encountered in the oil and gas industry is sour natural gas, i.e., natural gas that contains a significant amount of hydrogen sulfide. Sour natural gas, which can be collected from naturally occurring subsurface hydrocarbon reservoirs, is typically transported through a pipeline to a gas processing plant. At the gas processing plant, the sour natural gas is subjected to a sweetening process for removing at least some of its content of the hydrogen sulfide and/or carbon dioxide.

It is often impractical to provide a gas processing plant at the location where the sour gas is collected. For example, in some cases, the sour natural gas is collected from a reservoir in an area that is not convenient for the location of a gas processing plant. Further, it may be impractical to provide a gas processing plant for a single reservoir or well location. Instead, it may be desirable to use one gas processing plant to receive and process sour natural gas from multiple collection areas or reservoirs that are remote from one another, such that the gas processing plant is located far from one or more of the collection areas. Thus, the sour natural gas may be transported over long distances before being processed in the gas processing plant.

One such conventional system for transporting and processing sour natural gas hydrocarbons is shown in FIG. 1. The illustrated system includes four collection locations, each being located near a reservoir. Each collection location includes a metering station and a gas dehydration unit. Natural gas collected at each location is received and metered in the associated metering station. Water is removed in the gas dehydration unit, and the resulting dry, sour natural gas then flows through a pipeline to the gas processing plant. As illustrated, a single pipeline can receive sour natural gas from the various collection locations and provide a combined flow of the dry, sour natural gas to the gas processing plant.

The gas processing plant typically includes equipment for performing a sweetening operation to remove the acids from the gas. For example, the sweetening process can be performed by an absorber at the plant that uses a chemical and/or physical solvent to remove one or more acidic gases from the sour natural gas. The absorber typically receives the solvent with little sour gas content (i.e., as a sour gas-lean solvent) and mixes the solvent with the sour natural gas so that the solvent absorbs the acids from the sour gas, thereby forming a sweetened natural gas and a solvent with an increased content of sour gas (i.e., a sour gas-rich solvent). The sour gas-rich solvent is then delivered to a regeneration facility where the acid is removed from the solvent, thereby regenerating the solvent. The regenerated solvent can be reused (as sour gas-lean solvent), and the removed acid can be further processed, e.g., by sending removed sulfur to a sulfur forming plant that generates a usable sulfur output product.

In one particular system, the hydrogen sulfide concentration in the sour natural gas can be relatively high, up to about 15% or more, and the carbon dioxide concentration can be high as well, up to about 10% or more. Each collection location can be a considerable distance, perhaps up to 35 km, from the gas processing plant, and the collection locations can be in, and/or separated from the gas processing plant by, mountainous and/or densely populated areas. The sour natural gas can be transported through the pipeline at high pressures to the gas processing plant, where the sour natural gas is sweetened and sulfur is recovered.

The transportation of sour fluids can require special considerations, especially when the sour fluids are transported over long distances. For example, some metals are prone to sulfide stress cracking when exposed to hydrogen sulfide, so a conventional system for transporting sour fluids may require equipment made of particular metal alloys. Also, since hydrogen sulfide can be toxic to humans, an unintended release of the sour fluids to the environment may be undesirable, particularly in certain areas, such as densely populated regions. Accordingly, conventional systems typically include a variety of valves or other mechanical devices to limit the volume of gas that could be released in the event of a failure of any portion of the system. For example, the system of FIG. 1 would typically include isolation block valves at various locations along the pipeline and at each of the collection locations. The valves are normally open when the system is operating normally. If a failure occurs, e.g., a burst or other leak in the pipeline, some or all of the valves can be closed manually or automatically to isolate the portion of the system where the failure occurred and prevent additional release of gas.

While the use of valves can greatly improve the safety of the system, the valves can also complicate the construction and/or operation of the system, increase the costs of operation and/or maintenance of the system, and introduce additional points of possible failure. Thus, a continued need exists for an improved system for transporting and processing sour fluids.

SUMMARY OF THE INVENTION

The embodiments of the present invention generally provide systems and methods for transporting and processing sour gas, such as sour natural gas from a naturally occurring subsurface hydrocarbon reservoir, which can be treated by introducing a solvent into the sour natural gas. In some systems and methods of the present invention, the sour gas can be treated at the same location(s) where the sour gas is collected so that sweetened gas is transported instead of sour gas. The solvent used for the sweetening can be provided by a regeneration device, which can also be located remotely from the collection location, and which can provide solvent to multiple collectors of the sour fluid at different collection locations.

According to a method of one embodiment of the present invention, a sour gas is collected at a collection location that has an associated sweetening device. A solvent is delivered to the sweetening device from a regeneration device remote therefrom, and the sour gas is treated at the collection location with the solvent in the associated sweetening device to form a sweetened gas and a sour gas-rich solvent. The sweetened gas is transported from the sweetening device to a gas processing plant remote therefrom. The sour gas-rich solvent is delivered from the sweetening device to the regeneration device for regeneration therein. The regeneration device can be collocated with the gas processing plant or remote therefrom.

In some cases, the sour gas is collected at a plurality of gas collection locations, and each collection location has an associated sweetening device that receives sour gas for treatment therein. The solvent can be delivered from the regeneration device to each of the sweetening devices, the sweetened gas can be transporting from each of the collection locations to the gas processing plant via a common pipeline, and the sour gas-rich solvent from each of the sweetening devices can be delivered to the regeneration device.

The sweetened gas can be transported through a first pipeline between the sweetening device and the gas processing plant, the solvent can be delivered via a second pipeline between the regeneration device and the sweetening device, and the sour gas-rich solvent can be delivered via a third pipeline between the sweetening device and the regeneration device. In some cases, the sweetened gas and sour gas-rich solvent can be transported as a mixed phase fluid in a common pipeline, e.g., to transport the sweetened gas and sour gas rich solvent to a collocated gas processing plant and regeneration device.

The sour gas can be treated by injecting the sour gas and the solvent into a mixing unit at the collection location to form the sweetened gas and sour gas-rich solvent. In one example, the sour gas has a hydrogen sulfide content that is reduced from a content of more than 5.7 milligrams per cubic meter of the sour gas to a content of less than 5.7 milligrams per cubic meter of the sweetened gas, such that the sour gas is converted to a sweetened gas. In another example, the sour gas has a hydrogen sulfide content that is reduced from a content of more than 10 ppm of the sour gas to a content of less than 10 ppm of the sweetened gas.

According to another embodiment, a system includes a collector at a collection location that is configured to collect sour gas, and a sweetening device at the collection location and fluidly connected to the collector to receive the sour gas from the collector. The sweetening device is configured to treat the sour gas with a sour gas-lean solvent to form a sweetened gas and a sour gas-rich solvent. For example, the collector can be configured to collect sour natural gas from a naturally occurring subsurface hydrocarbon reservoir, and the sweetening device can be configured to treat the sour gas by introducing an amine solvent into the sour natural gas. The system also includes a regeneration device remote from the collection location and configured to deliver the sour gas-lean solvent to the sweetening device. At least one pipeline is configured to transport the sweetened gas from the sweetening device to a gas processing plant remote therefrom and deliver the sour gas-rich solvent from the sweetening device to the regeneration device for regeneration therein.

In some cases, the system includes a plurality of collectors and a plurality of sweetening devices. Each collector has an associated one of the sweetening devices that receives sour gas therefrom, and the regeneration device is configured to deliver the solvent to each of the sweetening devices. The pipeline can fluidly connect each of the collection locations to the gas processing plant via a common pipeline, and each of the sweetening devices can be configured to deliver the sour gas-rich solvent to the regeneration device.

The pipeline(s) can include a first pipeline fluidly connecting the sweetening device and the gas processing plant for transporting the sweetened gas from the sweetening device to the gas processing plant, a second pipeline fluidly connecting the regeneration device and the sweetening device for delivering the solvent from the regeneration device to the sweetening device, and a third pipeline fluidly connecting the sweetening device and the regeneration device for delivering the sour gas-rich solvent from the sweetening device to the regeneration device. In some cases, the system includes a common pipeline that is configured to receive the sweetened gas and the sour gas-rich solvent and transport the sweetened gas and the sour gas-rich solvent as a mixed phase fluid.

The system can also include a mixing unit at the collection location that is configured to receive and mix the sour gas and the sour gas-lean solvent to form the sweetened gas and sour gas-rich solvent. In some cases, the collector can be configured to provide the sour gas to the sweetening device with a hydrogen sulfide content of more than 5.7 milligrams per cubic meter of the sour gas and the sweetening device is configured to reduce the hydrogen sulfide content of the sour gas to less than 5.7 milligrams per cubic meter of the sweetened gas, thereby converting the sour gas to a sweetened gas. In other cases, the collector can be configured to provide the sour gas to the sweetening device with a hydrogen sulfide content of more than 10 ppm of the sour gas and the sweetening device is configured to reduce the hydrogen sulfide content of the sour gas to less than 10 ppm of the sweetened gas, thereby converting the sour gas to a sweetened gas.

By sweetening the gas at the one or more locations of collection, the subsequent transport of the gas can be simplified since the sour nature of the gas is reduced or eliminated. In this way, the system and method can potentially be simplified, and the costs of each can be reduced. In addition, the safety of the system may be increased, e.g., by sweetening a gas before it is transported a long distance and/or through densely populated or otherwise environmentally sensitive areas to reduce any risks associated with possible leaks from the system. Further, since the sweetened gas may be less corrosive than the unsweetened gas, the pipeline requirements may be reduced, potentially reducing the costs associated with the system. For example, it may be possible to use a pipeline made of a particular material that would not be acceptable if the pipeline were instead required to transport the unsweetened gas. If the regeneration device is located remotely from the collection location and/or the regeneration device is used to provide solvent to multiple collectors, the overall cost of the system and method can be reduced by eliminating the need for a regeneration device to be located at each collection location.

BRIEF DESCRIPTION OF THE DRAWINGS

Figure 1:
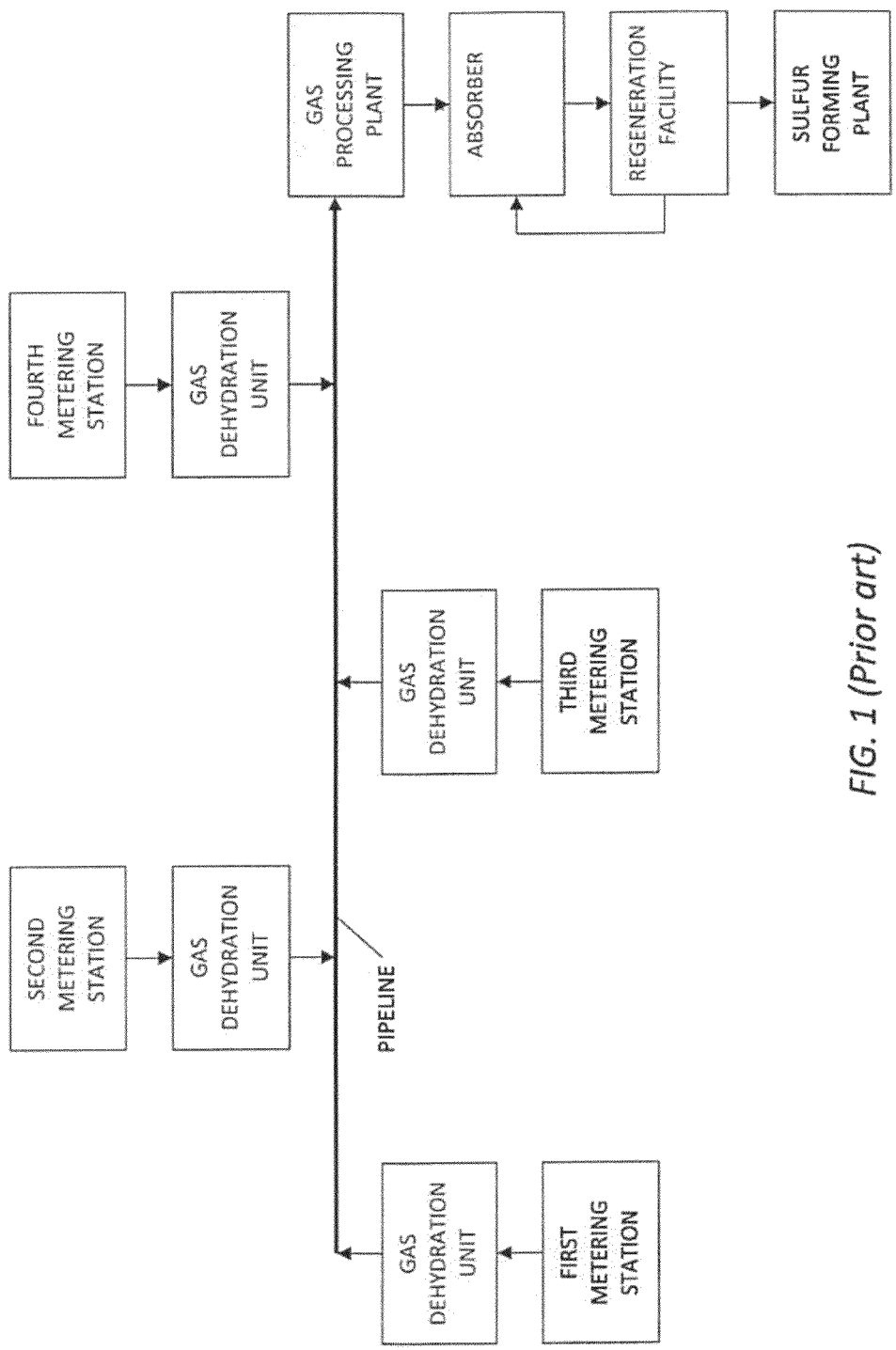
Figure 2:
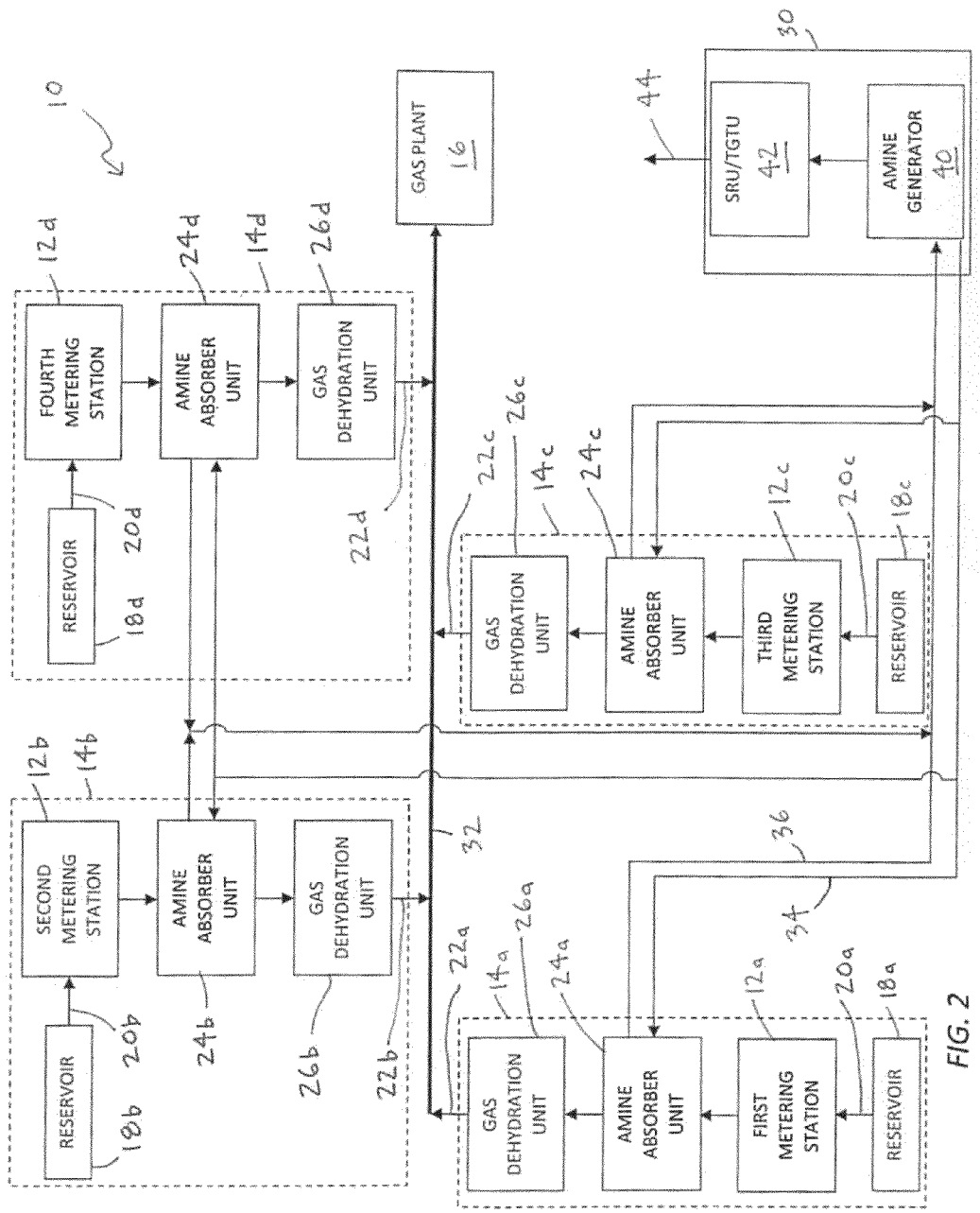
Figure 3:
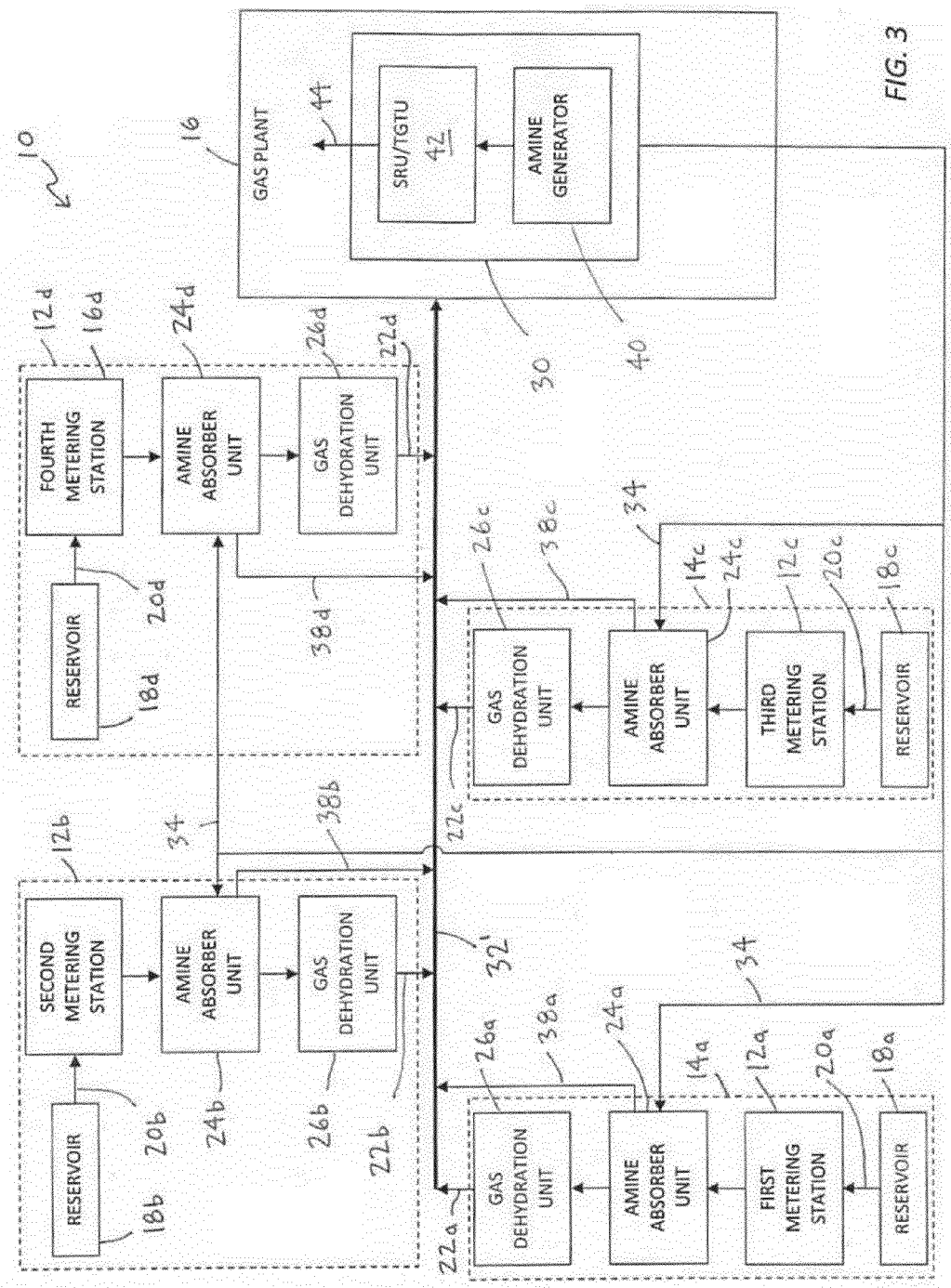

Having thus described the invention in general terms, reference will now be made to the accompanying drawings, which are not necessarily drawn to scale, and wherein:

FIG. 1 is a schematic view illustrating a conventional system for transporting and processing sour natural gas hydrocarbons;

FIG. 2 is a schematic view illustrating a sour fluid transporting and processing system according to one embodiment of the present invention; and FIG. 3 is a schematic view illustrating a sour fluid transporting and processing system according to another embodiment of the present invention.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Referring now to the drawings and, in particular, to FIG. 2, there is schematically shown a sour fluid transporting and processing system 10 according to one embodiment of the present invention. The system 10 can generally be used for handling and sweetening sour fluids, such as sour natural gas that is collected from one or more naturally occurring subsurface hydrocarbon reservoirs.

The system 10 can include any number of sour fluid collectors. In the example illustrated in FIG. 2, the system 10 has four sour fluid collectors 12a-12d, each of which is located at a different collection location 14a-14d and configured to collect sour gas that is provided from the respective collection locations 14a-14d to a gas processing plant 16. For example, each collector 12a-12d can be a device that is located at the site of a hydrocarbon reservoir. Each collector 12a-12d typically receives the natural gas via a well from a naturally occurring subterranean formation that contains natural gas. The collection locations 14a-14d can be remote from one another, e.g., miles apart in some cases, and the collectors 12a-12d can be configured to receive natural gas that is output from different reservoirs or different parts of common reservoirs.

The collector 12a-12d can include equipment for monitoring and/or controlling the flow of the natural gas. For example, each collector 12a-12d can be, or can include, a metering station that receives a flow of sour natural gas from a reservoir 18a-18d via an inlet pipe 20a-20d. The metering station 12a-12d measures and/or controls the flow of the sour natural gas through and out of the collector 12a-12d via an outlet pipe 22a-22d.

A sweetening device 24a-24d is typically located at each collection location 14a-14d to at least partially sweeten the sour natural gas. The sweetening device 24a-24d can be connected to the collector 12a-12d via the outlet pipe 22a-22d and configured to receive the flow of the sour natural gas from the collector 12a-12d and treat, or sweeten, the sour gas. This sweetening process removes at least some of the hydrogen sulfide and/or carbon dioxide from the sour natural gas to form a sweetened gas.

Other equipment can be provided at each collection location 14a-14d for further processing of the gas. For example, a dehydration unit 26a-26d can be provided at each location 14a-14s and configured to receive the sweetened gas from the associated sweetening device 14a-24d and remove water therefrom to provide a dry, sour gas to the outlet pipe 22a-22d.

The sweetening device 24a-24d can be an amine absorber unit, which can include a mixing unit at the collection location 14a-14d that is configured to receive and mix the sour gas and a solvent. The mixing unit can be a conventional mixer that mechanically mixes a flow of the solvent into the flow of the sour gas and/or a conventional absorption tower through which an upward flow of the sour gas is contacted with a downward flow of the solvent.

Various solvents can be used for sweetening the sour gas. For example, the solvent can be an amine solution, typically an aqueous solution of various alkanolamines, such as monoethanolamine (MEA), diethanolamine (DEA), methyldiethanolamine (MDEA), diisopropylamine (DIPA), aminoethoxyethanol (diglycolamine) (DGA), or mixtures thereof. The solvent is typically provided to the sweetening process with a low content of hydrogen sulfide, carbon dioxide, or other acid gas that is to be removed from the sour natural gas, i.e., the solvent is provided as a sour gas-lean solvent. As the solvent removes the acidic gas from the sour natural gas during the sweetening process, the solvent acquires a higher content of the acidic gas, i.e., to become a sour gas-rich solvent. The sour gas-rich solvent can be regenerated by removing the acidic gas content therefrom and then reused in the sweetening process as a sour gas-lean solvent.

In some cases, the sweetening process can remove most of the hydrogen sulfide and/or carbon dioxide from the sour natural gas. In addition, or alternative, the sweetening process can reduce a particular acid gas content by at least a predetermined amount or to below a predetermined content. For example, in some cases, the sour natural gas received by the collector 12a-12d has a hydrogen sulfide content of more than 5.7 milligrams per cubic meter of the sour natural gas (measured at 68° F. and an absolute pressure of 14.7 psi), and the sweetening process removes hydrogen sulfide therefrom to reduce the hydrogen sulfide to a content of less than 5.7 milligrams per cubic meter of the sweetened gas (measured at 68° F. and an absolute pressure of 14.7 psi). In this way, the sweetening process can be used to convert a gas typically characterized as "sour" (more than 5.7 milligrams of hydrogen sulfide per cubic meter of gas) to a gas that is typically characterized as "sweet" (less than 5.7 milligrams of hydrogen sulfide per cubic meter of gas). In this way, the sweetening process can be used to convert a gas typically characterized as "sour" (more than 5.7 milligrams of hydrogen sulfide per cubic meter of gas) to a gas that is typically characterized as "sweet" (less than 5.7 milligrams of hydrogen sulfide per cubic meter of gas).

Alternatively, the characterization of "sour" gas can include gases with more than 10 ppm hydrogen sulfide (e.g., 50 ppm or more), and the characterization of "sweet" gas can include gases with less than 10 ppm hydrogen sulfide (e.g., 7 ppm or less). In some cases, the sour natural gas received by the collector 12a-12d can have a hydrogen sulfide content of more than 10 ppm of the sour natural gas (e.g., 50 ppm or more), and the sweetening process can remove hydrogen sulfide therefrom to reduce the hydrogen sulfide to a content of less than 10 ppm of the sweetened gas (e.g., 7 ppm or less).

The solvent can be provided from a source that is located off-site from the collection locations 14a-14d. More particularly, the solvent can be provided from a remote regeneration device 30 that is configured to deliver the sour gas-lean solvent to each sweetening device 24a-24d. By remote, it is meant that the regeneration device 30 is at least 0.62 mile (1 kilometer), and typically at least one mile, from at least one of the collection locations 14a-14d, and typically from at least multiple collection locations 14a-14d.

The regeneration device 30 can include an amine generator 40, which can be a conventional device for supplying an amine that can be used as the solvent in the sweetening process performed in the sweetening devices 24a-24d. The amine generator 40 can receive the sour gas-rich solvent from the sweetening device 24a-24d and separate the amine for reuse. The sour stream output from the amine generator 40 can be delivered to a further processing device 42, e.g., a sulfur forming plant that includes equipment such as a sulfur recovery unit (SRU) and/or a tail gas treatment unit (TGTU). The processing device 42 can remove the sulfur, e.g., using a conventional Claus process for converting the hydrogen sulfide from the amine generator 40 to elemental sulfur, via output 44, for use or disposal.

Pipelines are typically provided for delivering the solvent from the regeneration device 30 to the collection locations 14a-14d and for transporting the sweetened gas from the collection locations 14a-14d to a gas processing plant 16. For example, as shown in FIG. 2, the regeneration device 30 and the gas processing plant 16 can be located separately from one another and each remotely from the collection locations 14a-14d. A first pipeline 32, which extends between and fluidly connects each of the collection locations 14a-14d and the gas processing plant 16, can be configured to transport the sweetened gas from the sweetening devices 24a-24d to the gas processing plant 16. Second and third pipelines 34, 36 can extend between and fluidly connect the sweetening devices 24a-24d at each collection location 14a-14d and the regeneration device 30. The second pipeline 34 can be configured to deliver the sour gas-lean solvent from the regeneration device 30 to the sweetening devices 24a-24d, and the third pipeline 36 can be configured to deliver the sour gas-rich solvent from the sweetening device 24a-24d back to the regeneration device 30 for regeneration therein. Each pipeline 32, 34, 36 can include one or more pipes or other tubular passages, and each pipeline 32, 34, 36 can include branches that extend to the various collection locations 14a-14d. As illustrated in FIG. 3, the regeneration device 30 can be collocated with the gas processing plant 16.

In some cases, the sweetened gas and the sour gas-rich solvent are transported from the collection locations 14a-14d in a common pipeline, i.e., in one or more pipes that are each configured to receive a mixture of the sweetened gas and the sour gas-rich solvent. The fluids typically include different phases, e.g., the sweetened gas may be mostly or entirely gaseous and the sour gas-rich solvent may be mostly or entirely liquid. Thus, when mixed in a common pipeline, the sweetened gas and sour gas-rich solvent can form a mixed phase fluid that is transported. For example, as illustrated in FIG. 3, the pipeline 32', which fluidly connects each of the collection locations 14a-14d and the gas processing plant 16, is configured to receive the sweetened gas from the sweetening devices 24a-24d and transport the sweetened gas to the gas processing plant 16. Pipe branches 38a-38d connect the sweetening devices 24a-24d to the first pipeline 32' so that the first pipeline 32' also fluidly connects the sweetening devices 24a-24d at each collection location 14a-14d to the regeneration device 30. The regeneration device 30, which is collocated at the gas processing plant 16 in this example, so that the first pipeline 32' is configured to deliver the sour gas-rich solvent from the sweetening device 24a-24d to the regeneration device 30. The third pipeline 36 of the system 10 shown in FIG. 2 is not required in the example of FIG. 3.

The transportation of sour fluids can require special considerations, especially when the sour fluids are transported over long distances. Unintended release of the sour fluids to the environment may be undesirable, particularly in certain areas, such as densely populated regions. Accordingly, conventional systems typically include a variety of valves or other mechanical devices to limit the volume of gas that could be released in the event of a failure of any portion of the system. For example, the conventional system of FIG. 1 would typically include isolation block valves at various locations along the pipeline and at each of the collection locations. The valves are normally open when the system is operating normally. If a failure occurs, e.g., a burst or other leak in the pipeline, some or all of the valves can be closed manually or automatically to isolate the portion of the system where the failure occurred and prevent additional release of gas.

As described herein, the systems 10 of the present invention can sweeten the sour gas at the collection locations so that the transportation of sour gas over long distance and/or through densely populated or otherwise environmentally sensitive areas is reduced or eliminated. Accordingly, the subsequent transportation of the sweetened gas to the gas processing plant 16 can be simplified, and the safety of the system 10 can be enhanced. In addition, the transportation of the sweetened gas may pose less corrosive hazards to the pipeline and other equipment of the system than that which would exist if the unsweetened gas were transported. In some cases, the costs associated with constructing and maintaining the system may be reduced. For example, since the transportation of sweetened gas generally requires fewer considerations than sour gas, the pipeline equipment may be simplified by requiring fewer isolation block valves or other devices and methods for responding to failure. Since the sweetened gas generally presents lower corrosive characteristics than the unsweetened gas, the pipeline or other equipment may be made of a particular metal alloy or other material that would not be acceptable if the system were instead required to transport the unsweetened gas, the useful lifetime of the system components may be lengthened, and/or the costs associated with inspection and maintenance of the system may be reduced. Further, in the event of a failure throughout the transportation components of the present systems 10, the risk of undesirable leaks of sour fluids can be reduced or eliminated.

Many modifications and other embodiments of the inventions set forth herein will come to mind to one skilled in the art to which these inventions pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising:
   a plurality of collectors at a plurality of collection locations configured to collect sour gas wherein each collector is located at a site of a subsurface hydrocarbon reservoir;
   a plurality of sweetening devices, each one of the sweetening devices located at each one of the plurality of collection locations and fluidly connected to one of the plurality of collectors to receive the sour gas from the collector, the plurality of sweetening devices configured to treat the sour gas with a sour gas-lean solvent to form a sweetened gas and a sour gas-rich solvent;
   a regeneration device remote from the plurality of collection locations and configured to deliver the sour gas-lean solvent to the plurality of sweetening devices wherein the regeneration device is at least 0.62 mile (1 kilometer) from the plurality of collection locations; and
   a first common pipeline configured to transport the sweetened gas from the plurality of sweetening devices to a gas processing plant remote therefrom and deliver the sour gas-rich solvent from the plurality of sweetening devices to the regeneration device for regeneration therein;
   wherein the plurality of sweetening devices are spaced along the length of the first common pipeline.

2. A system according to claim 1 wherein the regeneration device is collocated with the gas processing plant.

3. A system according to claim 1 wherein the plurality of sweetening devices is configured to treat the sour gas comprises by introducing an amine solvent into the sour natural gas.

4. A system according to claim 1, further comprising a second common pipeline fluidly connecting the regeneration device and the plurality of sweetening devices for delivering the solvent from the regeneration device to the plurality of sweetening devices, and a third common pipeline fluidly connecting the plurality of sweetening devices and the regeneration device for delivering the sour gas-rich solvent from the plurality of sweetening devices to the regeneration device.

5. A system according to claim 1 wherein the first common pipeline is configured to receive the sweetened gas and the sour gas-rich solvent and transport the sweetened gas and the sour gas-rich solvent as a mixed phase fluid.

6. A system according to claim 1, further comprising a mixing unit located at each of the plurality of collection locations configured to receive and mix the sour gas and the sour gas-lean solvent to form the sweetened gas and sour gas-rich solvent.

7. A system according to claim 1 wherein the plurality of collectors is configured to provide the sour gas to the plurality of sweetening devices with a hydrogen sulfide content of more than 5.7 milligrams per cubic meter of the sour gas and the plurality of sweetening devices is configured to reduce the hydrogen sulfide content of the sour gas to less than 5.7 milligrams per cubic meter of the sweetened gas.

8. A system according to claim 1 wherein at least one of the plurality of collection locations is separated from the gas processing plant by a densely populated area.

* * * * *